W. COLLINS.
RESILIENT TIRE FILLER.
APPLICATION FILED SEPT. 9, 1919.
1,402,212.
Patented Jan. 3, 1922.
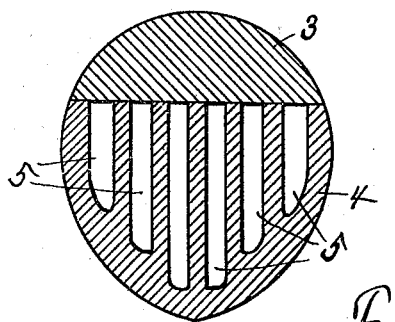
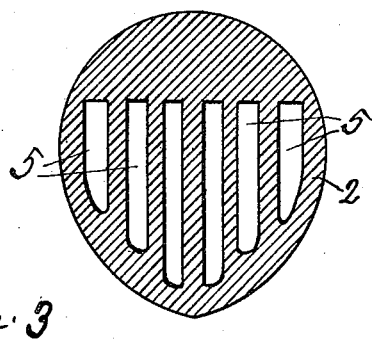
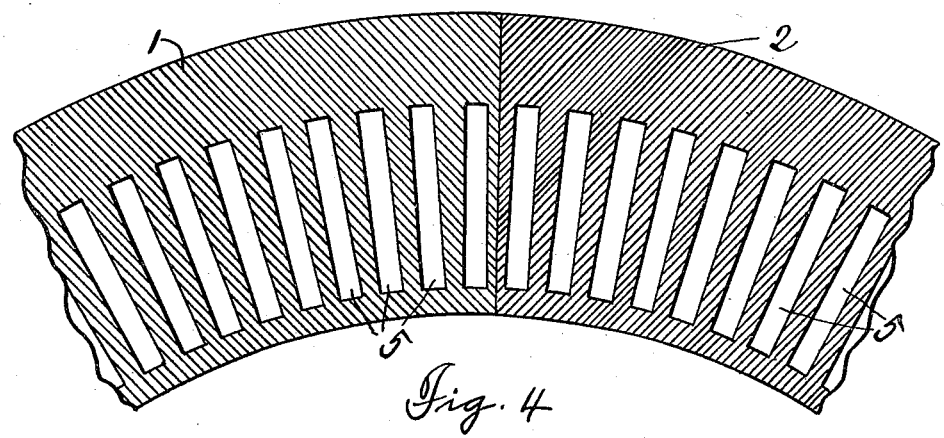
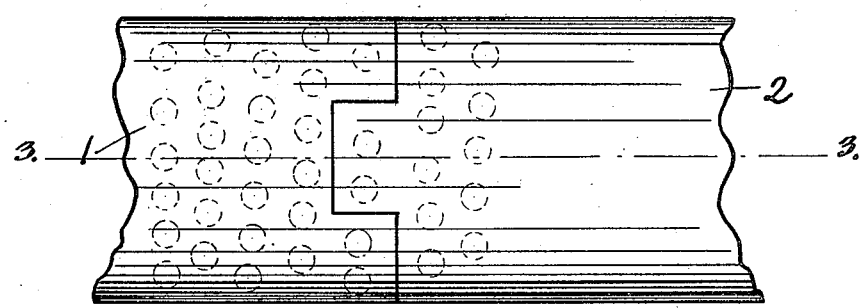

UNITED STATES PATENT OFFICE.

WARREN COLLINS, OF FORT WORTH, TEXAS.

RESILIENT TIRE FILLER.

1,402,212.  Specification of Letters Patent.  Patented Jan. 3, 1922.

Application filed September 9, 1919. Serial No. 322,718.

*To all whom it may concern:*

Be it known that I, WARREN COLLINS, a citizen of the United States of America, residing at Fort Worth, in the county of Tarrant and State of Texas, have invented certain new and useful Improvements in Resilient Tire Fillers, of which the following is a specification.

My invention relates to resilient fillers for tire casings and more particularly to an aircushioning means; and the objects are to provide a filler for tire casings in sections and to provide in each section cavities for containing air which are sealed airtight and to make such cavities in the forms of columns radially arranged so that the tire will have the full benefit of the pneumatic resistance and resiliency of the air columns which are sealed in the material. Other objects and advantages will be fully explained in the following description and the invention will be more particularly pointed out in the claim.

Reference is had to the accompanying drawings which form a part of the application.

Fig. 1 is a cross-section of the tire filler before the parts are vulcanized together. Fig. 2 is a cross-section of the same after the filler parts have been vulcanized together, the block becoming an integral mass during the vulcanizing and inclosing the air pockets. Fig. 3 is a longitudinal section of parts of two blocks after the parts of each block have been vulcanized together, taken on the line 3—3 of Fig. 4. Fig. 4 is a view of the exterior periphery, showing how two blocks are united.

Similar characters of reference are used to indicate the same parts throughout the several views.

The tire filler may be made of a plurality of blocks 1 and 2 of suitable dimensions and the blocks are united by dovetailing the meeting faces together, as shown in Fig. 4. Each block is made of two parts 3 and 4 and one part has a plurality of cavities 5 for containing air. It is apparent that the air cavities might be in either the outer or inner part. The cavities 5 are shown in the part 4. After the part 4 has been prepared with the cavities 5 therein, the part 3 is placed thereon inclosing the cavities 5 and the two parts 3 and 4 are placed in a suitable curing or baking mold and heat applied until the part 3 is thoroughly vulcanized to the part 4 so that the two parts become an integral mass as shown in Fig. 2 and in Fig. 3. The air columns 5 are sealed in the blocks and the blocks are placed in the tire casings, the ends being connected as shown in Fig. 4.

The blocks are to be made of rubber or some material which may be vulcanized together or which can be otherwise secured together so that the air columns will be sealed permanently when the blocks are ready to be placed in a tire casing. The material should be resilient to be similar in action to pneumatic tires. The air columns will aid in making the filler resilient and will also render the blocks or filler light. A tire constructed in this manner will have features of solid rubber tires and also have features of pneumatic tires in lightness and resiliency. The filler will be substantially puncture proof and will have all the advantages of solid rubber tires. Such filler will avoid the troubles of punctures because, a puncture would affect only the particular cavity which is penetrated and such puncture would be of no consequence because the filler is not an inflated filler.

What I claim is,—

A resilient tire filler comprising blocks of resilient material and having their meeting faces suitably united and each block being composed of two parts, one part having a plurality of air cavities therein and the other part being vulcanized thereto and sealing said cavities.

In testimony whereof, I set my hand, this 2nd day of September, 1919.

WARREN COLLINS.